US012625483B2

(12) United States Patent
Takahashi et al.

(10) Patent No.: US 12,625,483 B2
(45) Date of Patent: May 12, 2026

(54) ACTIVITY AMOUNT CALCULATION APPARATUS, SYSTEM INCLUDING ACTIVITY AMOUNT CALCULATION APPARATUS, AND ACTIVITY AMOUNT CALCULATION METHOD

(71) Applicant: Hitachi, Ltd., Tokyo (JP)

(72) Inventors: Kiyotaka Takahashi, Tokyo (JP); Takahiro Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 393 days.

(21) Appl. No.: 18/521,690

(22) Filed: Nov. 28, 2023

(65) Prior Publication Data

US 2024/0184261 A1 Jun. 6, 2024

(30) Foreign Application Priority Data

Dec. 5, 2022 (JP) ................................ 2022-194423

(51) Int. Cl.
*G05B 19/04* (2006.01)
*G05B 19/048* (2006.01)

(52) U.S. Cl.
CPC .. *G05B 19/048* (2013.01); *G05B 2219/14006* (2013.01)

(58) Field of Classification Search
CPC .................................................. G05B 19/048
USPC ........................................................ 700/108
See application file for complete search history.

(56) References Cited

U.S. PATENT DOCUMENTS

| | | | | | |
|---|---|---|---|---|---|
| 5,396,432 | A | * | 3/1995 | Saka | G05B 19/41865 |
| | | | | | 702/182 |
| 6,480,756 | B1 | * | 11/2002 | Luh | G05B 19/4183 |
| | | | | | 700/121 |
| 10,559,043 | B1 | * | 2/2020 | Schlintl | G06Q 10/06316 |
| 2003/0167238 | A1 | * | 9/2003 | Zeif | G06Q 10/0639 |
| | | | | | 705/400 |
| 2004/0176864 | A1 | * | 9/2004 | Cocco | G05B 19/4183 |
| | | | | | 707/999.104 |
| 2009/0099678 | A1 | * | 4/2009 | Kurata | H05K 13/086 |
| | | | | | 700/106 |

FOREIGN PATENT DOCUMENTS

| | | | |
|---|---|---|---|
| JP | 2009-245043 | A | 10/2009 |
| JP | 2010-097508 | A | 4/2010 |

* cited by examiner

*Primary Examiner* — Travis R Hunnings
(74) *Attorney, Agent, or Firm* — Baker Botts L.L.P.

(57) ABSTRACT
The invention presents an activity amount calculation apparatus, which includes a processor; a storage unit; and an interface configured to acquire information from a piece of equipment used for an operation of a process in a manufacturing line. The storage unit manages a standard operation time related to an operation time in the process. The processor acquires, using the interface from a piece of equipment that is an observation target in the manufacturing line, an actual value of a work time of the piece of equipment, and calculates, using the acquired actual value and the standard operation time of a process performed by a piece of equipment that is not the observation target in the manufacturing line, an activity amount of each piece of equipment in the manufacturing line.

15 Claims, 10 Drawing Sheets

FIG. 2

POWER SOURCE USE PLAN

| # | DATE | BREAKER ID | POWER SOURCE TYPE | START TIME | END TIME |
|---|------|-----------|-------------------|-----------|----------|
| 1 | 2022-04-01 | BUILDING A-1F-001 | POWER SYSTEM | 08:00 | 17:00 |
| 2 | 2022-04-01 | BUILDING A-1F-002 | POWER SYSTEM | 08:00 | 10:00 |
| 3 | 2022-04-01 | BUILDING A-1F-002 | RENEWABLE ENERGY | 10:00 | 15:00 |
| 4 | 2022-04-01 | BUILDING A-1F-002 | POWER SYSTEM | 15:00 | 17:00 |
| 5 | 2022-04-01 | BUILDING B-1F-001 | POWER SYSTEM | 08:00 | 17:00 |
| | | | | | |

PROCESS ENVIRONMENT INFORMATION

| # | PROCESS # | NAME | BREAKER ID | OBSERVED EQUIPMENT ID | STANDARD OPERATION TIME | CORRECTION THRESHOLD VALUE |
|---|-----------|------|-----------|-----------------------|-------------------------|----------------------------|
| 1 | 11 | PROCESSING 1 | BUILDING A-1F-002 | IPC3 | 20 MINUTES | 20% |
| 2 | 12 | ASSEMBLY 1 | BUILDING A-1F-003 | N/A | 10 MINUTES | 20% |
| 3 | 13 | ASSEMBLY 2 | BUILDING A-1F-004 | N/A | 15 MINUTES | 20% |
| 4 | 14 | INSPECTION 1 | BUILDING A-1F-004 | IPC5 | 5 MINUTES | 30% |
| 5 | 21 | PROCESSING 1 | BUILDING B-1F-001 | IPC8 | 40 MINUTES | 5% |
| 6 | 21 | PROCESSING 1 | BUILDING B-1F-001 | IPC20 | 40 MINUTES | 5% |
| | | | | | | |

MANUFACTURING LINE
CONFIGURATION INFORMATION

| # | LINE # | PROCESS # |
|---|--------|-----------|
| 1 | 1001 | 11 |
| 2 | 1001 | 12 |
| 3 | 1001 | 13 |
| 4 | 1001 | 14 |
| 5 | 2001 | 31 |
| | | |

FIG. 5

MANUFACTURING LINE TIME INFORMATION (PLANNED VALUE AND ACTUAL VALUE)

| # | LINE # | TAKT TIME | CYCLE TIME | CORRECTION THRESHOLD VALUE |
|---|--------|-----------|------------|----------------------------|
| 1 | 1001 | 50 MINUTES | 45 MINUTES | 20% |
| 2 | 1002 | 120 MINUTES | 118 MINUTES | 20% |
| 3 | 2001 | 40 MINUTES | 40 MINUTES | 10% |
| | | | | |
| | | | | |
| | | | | |

FIG. 6

OPERATOR INFORMATION

| # | OPERATOR ID | DATE | PROCESS ID |
|---|---|---|---|
| 1 | 100123 | 2022-04-01 | 11 |
| 2 | 100348 | 2022-04-01 | 14 |
| 3 | 100085 | 2022-04-01 | 21 |
|   |   |   |   |
|   |   |   |   |
|   |   |   |   |

FIG. 7

PROCESS ACTUAL PERFORMANCE INFORMATION (ACTUAL VALUE)

| # | PROCESS ID | DATE AND TIME | OPERATOR ID | OPERATION TIME (ACTUAL PERFORMANCE) |
|---|---|---|---|---|
| 1 | 11 | 2022-04-01 10:11:30 | 100123 | 20 MINUTES |
| 2 | 11 | 2022-04-01 10:22:05 | 100123 | 21 MINUTES |
| 2 | 14 | 2022-04-01 10:30:05 | N/A | 5 MINUTES |
| 3 | 14 | 2022-04-01 10:35:41 | N/A | 5 MINUTES |
| 3 | 21 | 2022-04-01 09:03:41 | 100085 | 41 MINUTES |
|   |   |   |   |   |

*FIG. 8*

EQUIPMENT INFORMATION

| # | EQUIPMENT ID | PROVIDING I/F |
|---|---|---|
| 1 | IPC1 | SQL/REST |
| 2 | IPC3 | OPC UA |
| 3 | IPC5 | REST |
| 4 | PLC1 | Modbus |
| | | |
| | | |

FIG. 10

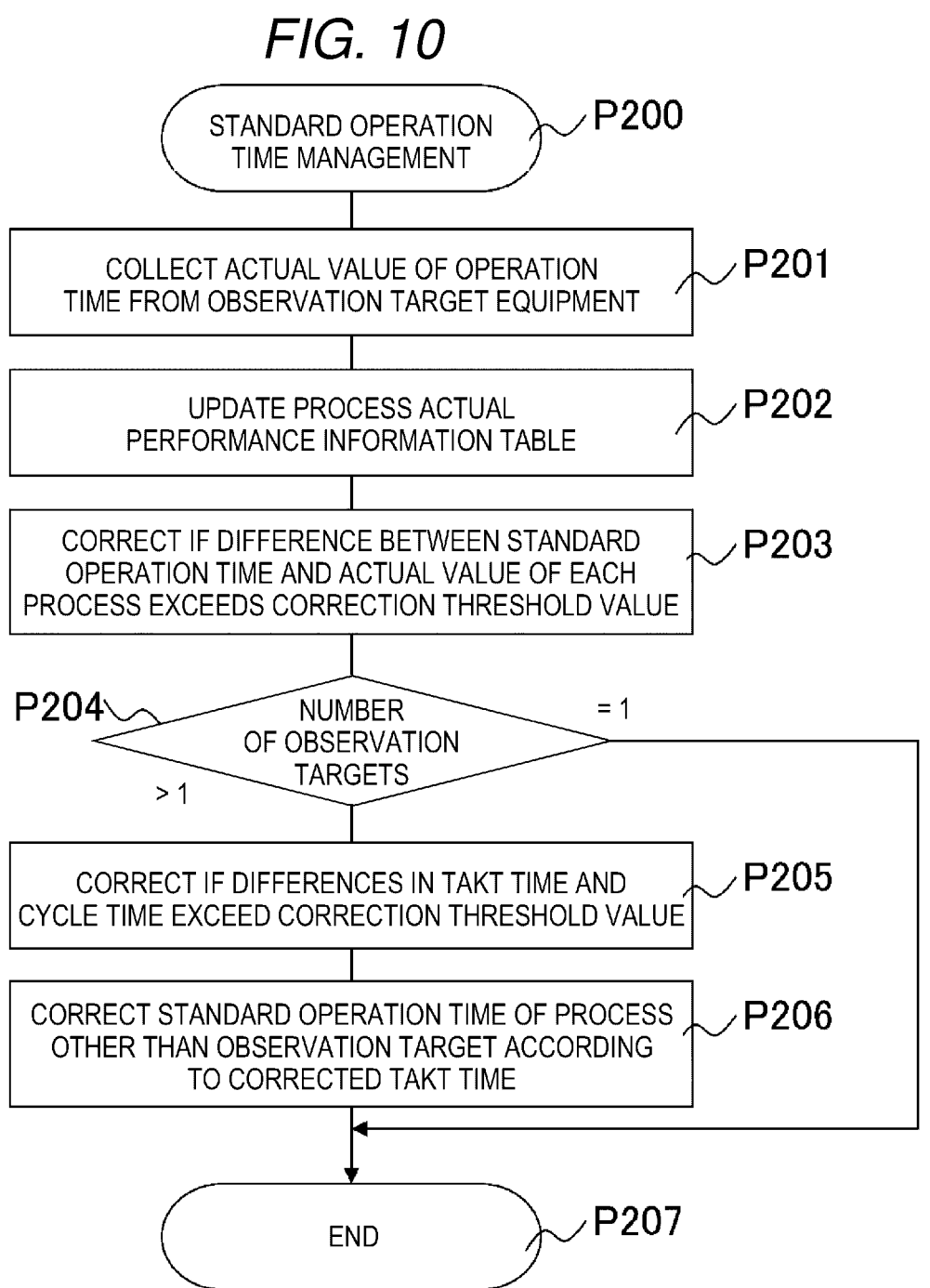

STANDARD OPERATION
TIME MANAGEMENT — P200

COLLECT ACTUAL VALUE OF OPERATION
TIME FROM OBSERVATION TARGET EQUIPMENT — P201

UPDATE PROCESS ACTUAL
PERFORMANCE INFORMATION TABLE — P202

CORRECT IF DIFFERENCE BETWEEN STANDARD
OPERATION TIME AND ACTUAL VALUE OF EACH
PROCESS EXCEEDS CORRECTION THRESHOLD VALUE — P203

P204 — NUMBER
OF OBSERVATION
TARGETS

= 1

> 1

CORRECT IF DIFFERENCES IN TAKT TIME AND
CYCLE TIME EXCEED CORRECTION THRESHOLD VALUE — P205

CORRECT STANDARD OPERATION TIME OF PROCESS
OTHER THAN OBSERVATION TARGET ACCORDING
TO CORRECTED TAKT TIME — P206

END — P207

FIG. 11

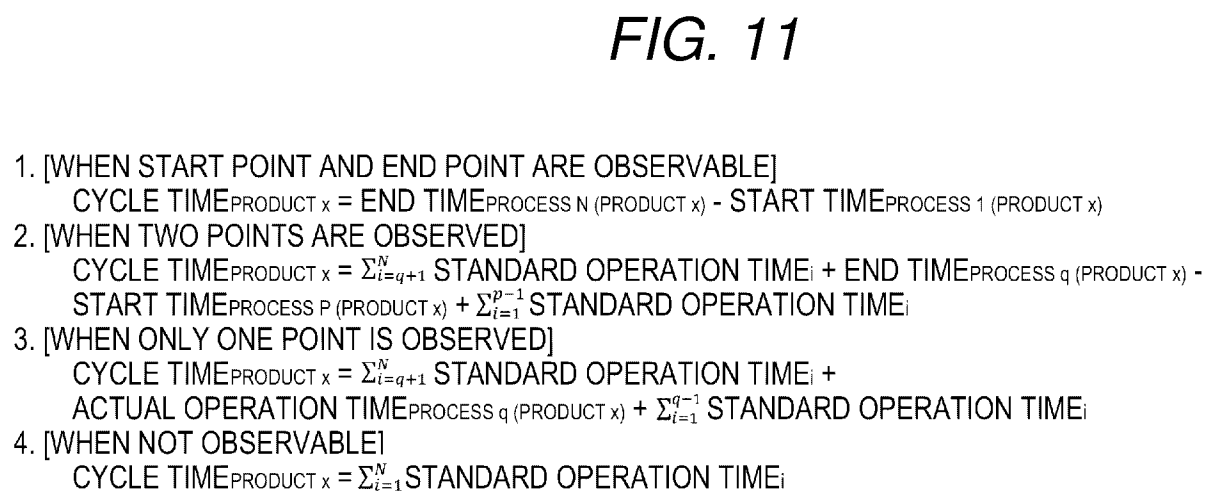

1. [WHEN START POINT AND END POINT ARE OBSERVABLE]
   CYCLE TIME$_{PRODUCT\ x}$ = END TIME$_{PROCESS\ N\ (PRODUCT\ x)}$ - START TIME$_{PROCESS\ 1\ (PRODUCT\ x)}$

2. [WHEN TWO POINTS ARE OBSERVED]
   CYCLE TIME$_{PRODUCT\ x}$ = $\sum_{i=q+1}^{N}$ STANDARD OPERATION TIME$_i$ + END TIME$_{PROCESS\ q\ (PRODUCT\ x)}$ -
   START TIME$_{PROCESS\ P\ (PRODUCT\ x)}$ + $\sum_{i=1}^{p-1}$ STANDARD OPERATION TIME$_i$ 3. [WHEN ONLY ONE POINT IS OBSERVED]
   CYCLE TIME$_{PRODUCT\ x}$ = $\sum_{i=q+1}^{N}$ STANDARD OPERATION TIME$_i$ +
   ACTUAL OPERATION TIME$_{PROCESS\ q\ (PRODUCT\ x)}$ + $\sum_{i=1}^{q-1}$ STANDARD OPERATION TIME$_i$ 4. [WHEN NOT OBSERVABLE]
   CYCLE TIME$_{PRODUCT\ x}$ = $\sum_{i=1}^{N}$ STANDARD OPERATION TIME$_i$

FIG. 12

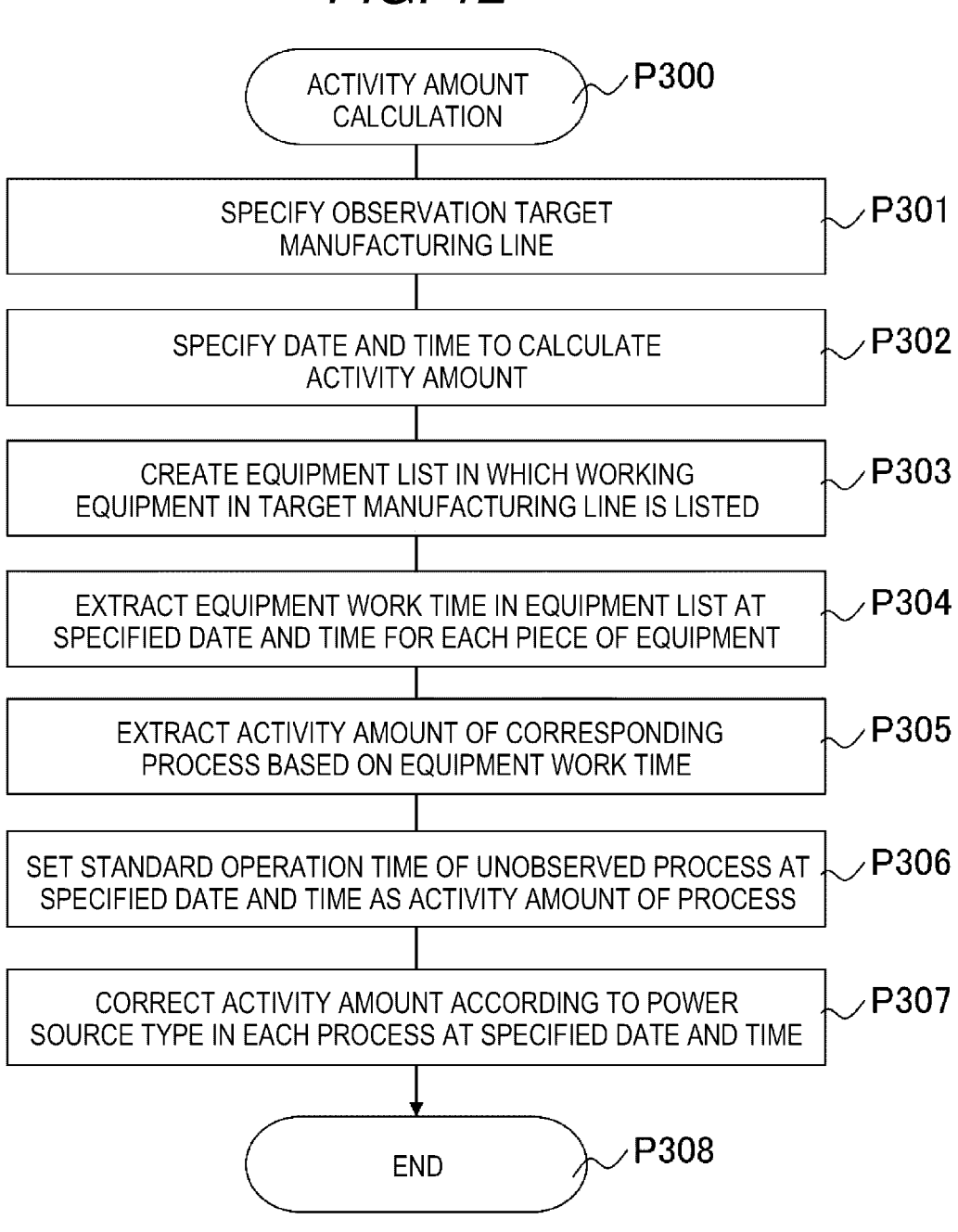

ACTIVITY AMOUNT CALCULATION ~P300

SPECIFY OBSERVATION TARGET MANUFACTURING LINE ~P301

SPECIFY DATE AND TIME TO CALCULATE ACTIVITY AMOUNT ~P302

CREATE EQUIPMENT LIST IN WHICH WORKING EQUIPMENT IN TARGET MANUFACTURING LINE IS LISTED ~P303

EXTRACT EQUIPMENT WORK TIME IN EQUIPMENT LIST AT SPECIFIED DATE AND TIME FOR EACH PIECE OF EQUIPMENT ~P304

EXTRACT ACTIVITY AMOUNT OF CORRESPONDING PROCESS BASED ON EQUIPMENT WORK TIME ~P305

SET STANDARD OPERATION TIME OF UNOBSERVED PROCESS AT SPECIFIED DATE AND TIME AS ACTIVITY AMOUNT OF PROCESS ~P306

CORRECT ACTIVITY AMOUNT ACCORDING TO POWER SOURCE TYPE IN EACH PROCESS AT SPECIFIED DATE AND TIME ~P307

END ~P308

FIG. 13

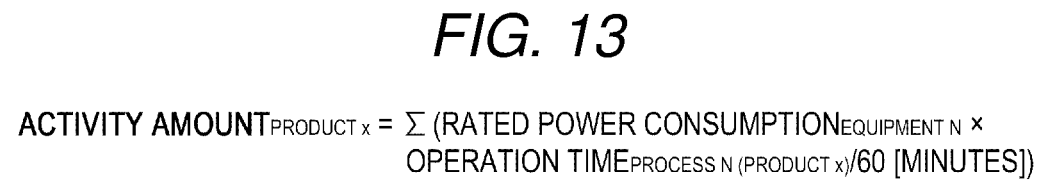

ACTIVITY AMOUNT$_{PRODUCT\,x}$ = $\Sigma$ (RATED POWER CONSUMPTION$_{EQUIPMENT\,N}$ $\times$
OPERATION TIME$_{PROCESS\,N\,(PRODUCT\,x)}$/60 [MINUTES])

ACTIVITY AMOUNT CALCULATION APPARATUS, SYSTEM INCLUDING ACTIVITY AMOUNT CALCULATION APPARATUS, AND ACTIVITY AMOUNT CALCULATION METHOD

BACKGROUND OF THE INVENTION

1. Field of the Invention

The present invention relates to an activity amount calculation apparatus, a system including an activity amount calculation apparatus, and an activity amount calculation method.

2. Description of Related Art

JP2010-97508A relates to a process of calculating an environmental load of a product, and discloses a technique of "receiving an actual line electric power consumption of a manufacturing line, an apparatus characteristic of each apparatus in the manufacturing line, rated electric power of each apparatus, and numerical data of each specification item of each product (S31), determining a coefficient of each apparatus using a relationship between the apparatus characteristic and a ratio (coefficient) of an actual electric power consumption to the rated electric power of the apparatus (S32), determining a correlated specification item of each apparatus using an apparatus characteristic-correlated specification item relationship which relates the apparatus characteristic to a specification item correlated with apparatus electric power consumption (S33), distributing the actual line electric power consumption for each apparatus using the rated electric power and the coefficient for each apparatus and obtaining the electric power consumption for each apparatus (S34), distributing an electric power consumption for each apparatus for each product using the numerical data on the correlated specification item for each apparatus and obtaining the electric power consumption for each apparatus and for each product (S35), and obtaining an electric power consumption for manufacturing the product for each product using the electric power consumption for each apparatus and for each product (S36)".

JP2009-245043A is intended for a manufacturing line such as a low-volume high-mix manufacturing line in which a takt time varies, and discloses a method of estimating magnitude of the variation and reducing the variation by devising a line design, providing support to an operator, and assigning a high-skill operator.

CITATION LIST

Patent Literature

PTL 1: JP2010-97508A
PTL 2: JP2009-245043A

SUMMARY OF THE INVENTION

In order to implement carbon neutral (CN), for example, a business operator owning a manufacturing line is required to manage a greenhouse gas (GHG) emission when a product is manufactured. Here, when an equipment activity amount is used to calculate the GHG emission, it is conceivable that it is necessary to acquire information from all pieces of equipment used for manufacturing. However, not all pieces of equipment in the manufacturing line necessarily include an information-providing interface (I/F), and necessary information may not be acquired.

According to the invention, an activity amount calculation apparatus and a system according to the following aspects are provided. The activity amount calculation apparatus includes a processor, a storage unit, and an interface configured to acquire information from a piece of equipment used for an operation of a process in a manufacturing line. The storage unit manages a standard operation time related to an operation time in the process. The processor acquires, using the interface from a piece of equipment that is an observation target in the manufacturing line, an actual value of a work time of the piece of equipment. Then, the processor calculates, using the acquired actual value and the standard operation time of the process performed by a piece of equipment that is not the observation target in the manufacturing line, the activity amount of each piece of equipment in the manufacturing line. In addition, there is provided a system including the activity amount calculation apparatus and a higher-level system configured to manage a manufacturing site, in which the activity amount calculation apparatus is used as an apparatus configured to relay a manufacturing line and the higher-level system.

According to the invention, an activity amount calculation method according to the following aspect is provided. The activity amount calculation method is a method performed by an activity amount calculation apparatus including a processor, a storage unit configured to manage a standard operation time related to an operation time in a process, and an interface configured to acquire information from a piece of equipment used for an operation of the process in a manufacturing line. The processor acquires, using the interface from a piece of equipment that is an observation target in the manufacturing line, an actual value of a work time of the piece of equipment, and calculates, using the acquired actual value and the standard operation time of a process performed by a piece of equipment that is not the observation target in the manufacturing line, an activity amount of each piece of equipment in the manufacturing line.

According to the invention, even when necessary information cannot be acquired from equipment, it is possible to calculate the activity amount of each piece of equipment in the manufacturing line by using the managed standard operation time. Problems, configurations, and effects other than those described above will become apparent in the following description of embodiments of the invention.

BRIEF DESCRIPTION OF THE DRAWINGS

FIG. 2 shows a configuration example of a power source use plan;

FIG. 3 shows a configuration example of process environment information;

FIG. 4 shows a configuration example of manufacturing line configuration information;

FIG. 5 shows a configuration example of manufacturing line time information;

FIG. 6 shows a configuration example of operator information;

FIG. 7 shows a configuration example of process actual performance information;

FIG. 8 shows a configuration example of equipment information;

FIG. 10 is a flowchart showing an example of standard operation time management;

FIG. 11 is an example of a calculation formula used for calculating a cycle time;

FIG. 12 is a flowchart showing an example of manufacturing process activity amount calculation; and FIG. 13 is an example of a calculation formula used for calculating an activity amount.

DESCRIPTION OF EMBODIMENTS

Figure 1:
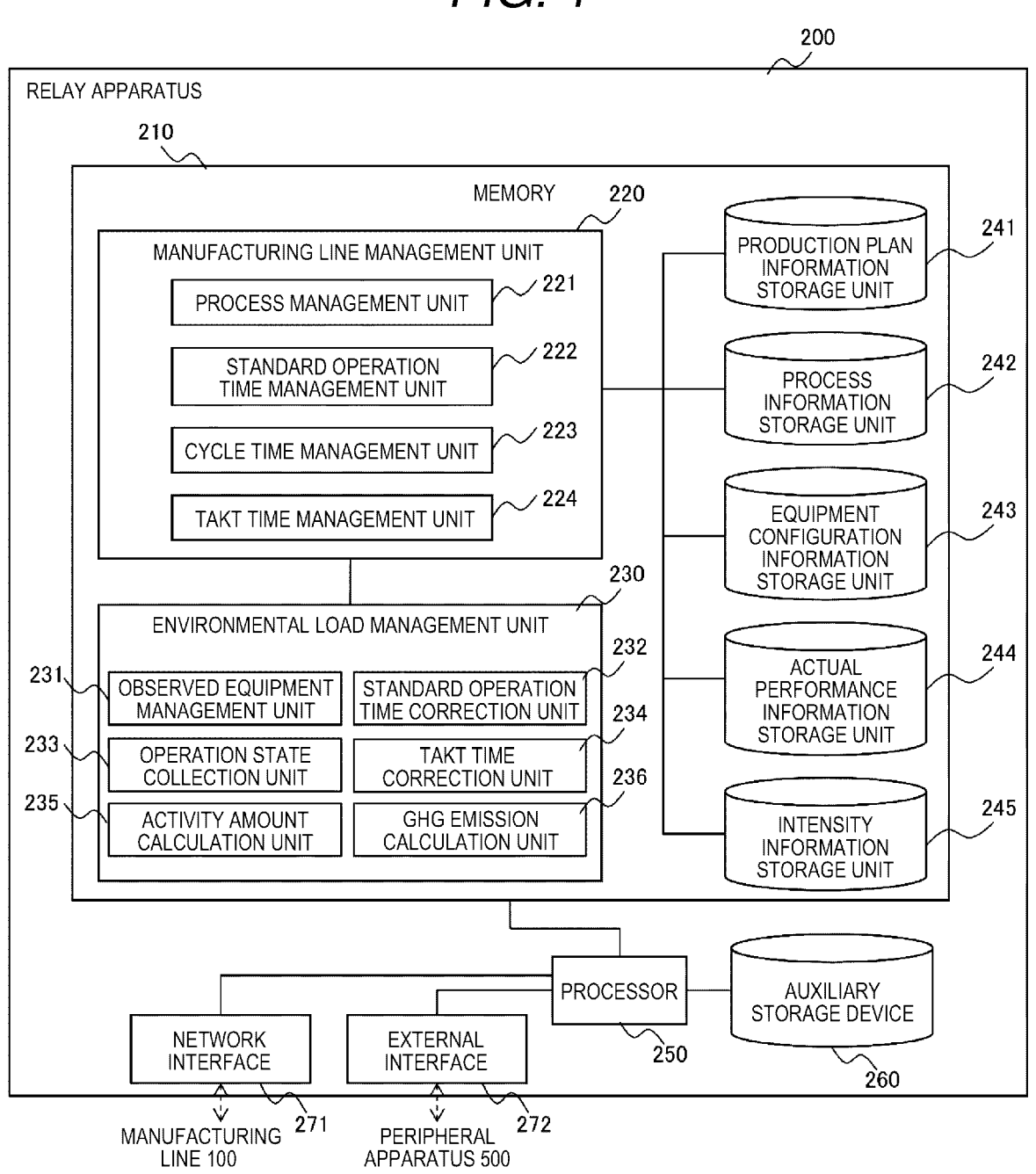
FIG. 1 shows an example of a configuration of a relay apparatus.

Hereinafter, an embodiment according to the invention will be described with reference to the drawings. The embodiment is an example for describing the invention, and is omitted and simplified as appropriate for clarity of description. The invention can be implemented in various other aspects. Unless otherwise specified, each element may be single or plural.

In order to facilitate understanding of the invention, the position, size, shape, range, and the like of each element shown in the drawings may not represent the actual position, size, shape, range, and the like. Therefore, the invention is not necessarily limited to the positions, sizes, shapes, ranges, and the like disclosed in the drawings.

As examples of various types of information, expressions such as "table", "list", and "queue" may be used for description, but the various types of information may be expressed in a data structure other than these described. For example, various types of information such as "XX table", "XX list", and "XX queue" may be "XX information". In description of identification information, when expressions such as "identification information", "identifier", "name", "ID", and "number" are used, the expressions can be replaced with one another.

When there are a plurality of elements having the same or similar functions, the same reference numerals may be assigned with different subscripts. When it is not necessary to distinguish the plurality of elements, the subscripts may be omitted from the description.

In the embodiment, processing performed by executing a program may be described. Here, a computer executes the program by a processor (for example, a CPU or a GPU) and performs processing defined by the program using a storage resource (for example, a memory), an interface device (for example, a communication port), or the like. Therefore, a subject of the processing performed by executing the program may be the processor. Similarly, the subject of the processing performed by executing the program may be a controller, an apparatus, a system, a computer, or a node including the processor. The subject of the processing performed by executing the program may be an arithmetic unit and may include a dedicated circuit that performs specific processing. Here, the dedicated circuit is, for example, a field programmable gate array (FPGA), an application specific integrated circuit (ASIC), or a complex programmable logic device (CPLD).

The program may be installed on the computer from a program source. The program source may be, for example, a program distribution server or a computer-readable storage medium. When the program source is the program distribution server, the program distribution server may include a processor and a storage resource for storing the program to be distributed, and a processor of the program distribution server may distribute the program to be distributed to another computer. In an example, two or more programs may be implemented as one program, or one program may be implemented as two or more programs.

A relay apparatus will be described with reference to FIG. 1. A relay apparatus 200 (activity amount calculation apparatus) is an apparatus that relays a site and a higher-level system, and is an apparatus that transmits acquired information, information generated by processing, and the like to the higher-level system. In the present embodiment, the relay apparatus 200 relays one or more manufacturing lines 100 in a manufacturing site and a management system of the manufacturing site via communication. Here, in the manufacturing line 100, various types of equipment used for performing an operation are prepared for each process.

As shown in FIG. 1, the relay apparatus 200 includes a memory 210 that stores various programs and data, a processor 250 that executes the programs stored in the memory 210, an auxiliary storage device 260 that permanently holds programs and data, a network interface 271 that provides connection by communicating with an external computer or the like, and an external interface 272 that connects various input and output apparatuses (a peripheral apparatus 500 in FIG. 1) such as a keyboard and a display.

The memory 210 stores a manufacturing line management unit 220, which is a program for implementing a function and the like related to management of the manufacturing line 100, and an environmental load management unit 230, which stores a program for implementing a function and the like related to environmental load management of the manufacturing line 100. In the memory 210, storage areas (241 to 245) are also provided, in which data is stored for processing by the manufacturing line management unit 220 and the environmental load management unit 230.

As an example, the manufacturing line management unit 220 has functions of a process management unit 221, a standard operation time management unit 222, a cycle time management unit 223, and a takt time management unit 224. The process management unit 221 handles information on each process constituting the manufacturing line 100. The standard operation time management unit 222 handles a standard operation time for an operation performed in each process. The standard operation time is a standard operation time of the process. The cycle time management unit 223 handles an actual operation time (so-called cycle time) of the manufacturing line 100 constituted by each process. The takt time management unit 224 handles a planned operation time (so-called takt time) of the manufacturing line 100.

As an example, the environmental load management unit 230 has functions of an observed equipment management unit 231, a standard operation time correction unit 232, an operation state collection unit 233, a takt time correction unit 234, an activity amount calculation unit 235, and a GHG emission calculation unit 236. The observed equipment management unit 231 manages equipment whose work state and the like is observed in the manufacturing line 100 managed by the manufacturing line management unit 220. The standard operation time correction unit 232 corrects, with reference to an equipment observation result, actual performance information so far, and the like, the standard operation time handled by the standard operation time management unit 222 of the manufacturing line management unit 220. The operation state collection unit 233 collects, from equipment selected as an observation target by the observed equipment management unit 231, information on an operation state of a process performed by the equipment. The takt time correction unit 234 corrects, with reference to actual performance information such as the cycle time and the equipment observation result, the takt time handled by the takt time management unit 224. The activity amount calculation unit 235 calculates an activity amount, and calculates the activity amount of each process in consideration of, for example, information on the process managed by the manufacturing line management unit 220, the standard operation time of each process, the takt time and the cycle time of the manufacturing line 100, actual performance information obtained by observing each piece of equipment, and a power source type when manufacturing is performed. The GHG emission calculation unit 236 calculates a GHG emission using the calculated activity amount and information on GHG intensity. For example, the GHG emission calculation unit 236 calculates the GHG emission based on a product of the activity amount and the intensity.

In relation to the manufacturing line 100 targeted by the relay apparatus 200, the memory 210 includes a production plan information storage unit 241, a process information storage unit 242, an equipment configuration information storage unit 243, an actual performance information storage unit 244, and an intensity information storage unit 245. The production plan information storage unit 241 stores a plan related to production and a plan for a type of a power source that supplies electric power to production equipment. The process information storage unit 242 stores information on each process. The equipment configuration information storage unit 243 stores information on working equipment in each process. The actual performance information storage unit 244 stores information obtained by observing the working equipment. The intensity information storage unit 245 stores information on an intensity to be referred to when calculating the GHG emission.

Next, various types of data will be described with reference to FIGS. 2 to 8. First, an example of a power source use plan will be described with reference to FIG. 2. A power source use plan 610 is information on a plan for a power source to be used in relation to the manufacturing line 100 targeted by the relay apparatus 200, and is stored in the production plan information storage unit 241. The power source use plan 610 is referred to, for example, by the process management unit 221 which handles information on each process constituting the manufacturing line during processing by the manufacturing line management unit 220. The power source use plan 610 is also referred to, for example, by the activity amount calculation unit 235 which calculates the activity amount of each process in the environmental load management unit 230.

As an example, the power source use plan 610 includes a # field 611, a date field 612, a breaker ID field 613, a power source type field 614, a start time field 615, and an end time field 616. The # field 611 indicates information for identifying an entry. The date field 612 indicates a date of information indicated by the entry. The breaker ID field 613 indicates information for identifying a power source indicated by the entry. The power source type field 614 indicates a power source type indicated by the entry. The start time field 615 indicates a time when use of electric power according to the power source type indicated by the entry is started at a place identified by the breaker ID. The end time field 616 indicates a time when the use of the electric power according to the power source type indicated by the entry is ended at the place identified by the breaker ID.

Next, an example of process environment information will be described with reference to FIG. 3. Process environment information 620 is stored in the process information storage unit 242 which manages the information on each process related to the manufacturing line 100 targeted by the relay apparatus 200. The process environment information 620 is referred to, for example, by the process management unit 221, the standard operation time management unit 222 that manages the standard operation time of each process, and the cycle time management unit 223 that manages the cycle time of the manufacturing line in the manufacturing line management unit 220. The process environment information 620 is also referred to, for example, by the standard operation time correction unit 232 which determines the correction of the standard operation time of each process and the activity amount calculation unit 235 in the environmental load management unit 230.

As an example, the process environment information 620 includes a # field 621, a process # field 622, a name field 623, a breaker ID field 624, an observed equipment ID field 625, a standard operation time field 626, and a correction threshold value field 627. The # field 621 indicates information for identifying an entry. The process # field 622 indicates information for identifying a process indicated by the entry. The name field 623 indicates information assigned to the process indicated by the entry in order to facilitate understanding or remembering of the process by a person. The breaker ID field 624 indicates information for identifying a power source used in the process indicated by the entry. The observed equipment ID field 625 indicates information for identifying equipment used in the process indicated by the entry. The standard operation time field 626 indicates the standard operation time of the process indicated by the entry. The correction threshold value field 627 indicates information referred to in order to determine whether to correct a value of the standard operation time of the process indicated by the entry when an operation is performed.

Next, an example of manufacturing line configuration information will be described with reference to FIG. 4. Manufacturing line configuration information 630 is stored in the process information storage unit 242 which manages the information on each process constituting the manufacturing line 100 in relation to the manufacturing line 100 targeted by the relay apparatus 200. The manufacturing line configuration information 630 is referred to, for example, by the process management unit 221 in the manufacturing line management unit 220. The manufacturing line configuration information 630 is also referred to, for example, by the observed equipment management unit 231 in the environmental load management unit 230, which manages the observed equipment in the manufacturing line 100.

The manufacturing line configuration information 630 includes, for example, a # field 631 for identifying an entry, a line # field 632 for identifying a manufacturing line indicated by the entry, and a process # field 633 for identifying a process indicated by the entry.

Next, an example of manufacturing line time information will be described with reference to FIG. 5. Manufacturing line time information 640 is stored in the actual performance information storage unit 244 that manages information observed in the manufacturing line 100 targeted by the relay apparatus 200. The manufacturing line time information 640 is referred to, for example, by the cycle time management unit 223 managing the cycle time which is an actual operation time for manufacturing by the manufacturing line 100, and the takt time management unit 224 managing the takt time which is a planned operation time for manufacturing by the manufacturing line in the manufacturing line management unit 220. The manufacturing line time information 640 is also referred to, for example, by the takt time correction unit 234 correcting the takt time that is the planned operation time for manufacturing by the manufacturing line in the environmental load management unit 230.

As an example, the manufacturing line time information 640 includes a # field 641, a line # field 642, a takt time field 643, a cycle time field 644, and a correction threshold value field 645. The # field 641 indicates information for identifying an entry. The line # field 642 indicates information for identifying a manufacturing line indicated by the entry. The takt time field 643 indicates a value of the takt time planned in the line indicated by the entry. The cycle time field 644 indicates a value of the cycle time observed in the line indicated by the entry. The correction threshold value field 645 indicates information referred to for determining whether to correct the value of the takt time indicated by the entry when an operation through the line is completed.

The value of the cycle time field 644 may be an estimated value, and the estimated value may be, for example, a value estimated using the standard operation time.

Next, an example of operator information will be described with reference to FIG. 6. Operator information 650 relates to a record of an operator who performs an operation in a manufacturing line, and is stored in the production plan information storage unit 241 that manages the plan related to production and the plan for the type of the power source that supplies electric power to production equipment. The operator information 650 is referred to, for example, by the operation state collection unit 233 in the environmental load management unit 230, which collects an operation state of the process in the manufacturing line 100.

As an example, the operator information 650 includes a # field 651 for identifying an entry, an operator ID field 652 for identifying an operator indicated by the entry, a date field 653 indicating a date of information indicated by the entry, and a process # field 654 for identifying a process indicated by the entry.

Next, an example of process actual performance information will be described with reference to FIG. 7. Process actual performance information 660 relates to a record when an operation is performed in each process in the manufacturing line 100, and is stored in the actual performance information storage unit 244 that manages the information observed in the manufacturing line 100 targeted by the relay apparatus 200. The process actual performance information 660 is referred to, for example, by the cycle time management unit 223 in the manufacturing line management unit 220. The process actual performance information 660 is referred to, for example, by the standard operation time correction unit 232, the operation state collection unit 233, the takt time correction unit 234, and the activity amount calculation unit 235 in the environmental load management unit 230.

As an example, the process actual performance information 660 includes a # field 661, a process # field 662, a date-and-time field 663, an operator ID field 664, and an operation time (actual performance) field 665. The # field 661 indicates information for identifying an entry. The process # field 662 indicates information for identifying a process indicated by the entry. The date-and-time field 663 indicates a date and time of information indicated by the entry. The operator ID field 664 indicates information for identifying an operator or the like indicated by the entry. The operation time (actual performance) field 665 indicates an operation time when the operator or the like indicated in the operator ID field 664 performs the process indicated by the entry at the date and time indicated in the date-and-time field 663.

The operator ID field 664 basically stores ID information (a six-digit number in the example in FIG. 7) for identifying the operator. However, when the ID information on the operator is unknown, N/A is stored. When the operation is automatically performed by equipment without any operator, information for identifying the equipment may be stored.

Next, an example of equipment information will be described with reference to FIG. 8. Equipment information 670 is stored in the equipment configuration information storage unit 243 which manages the information on working equipment in each process. The equipment information 670 is referred to, for example, by the observed equipment management unit 231 and the operation state collection unit 233 in the environmental load management unit 230.

As an example, the equipment information 670 includes a # field 671 for identifying an entry, an equipment ID field 672 for identifying equipment used in a process indicated by the entry, and a providing I/F field 673 indicating an I/F which is provided in the equipment identified by the equipment ID field 672 indicated by the entry and which is provided to exchange observation data with the outside. When the equipment does not include the I/F, N/A is stored in the providing I/F field 673 corresponding to the equipment ID indicating the equipment.

Next, an operation example of the relay apparatus will be described with reference to FIGS. 9 to 11. First, an example of processing related to observed equipment selection will be described with reference to FIG. 9. Observed equipment is equipment that is observed by the relay apparatus and for which observation data is acquired when calculating the GHG emission in the manufacturing line.

In observed equipment selection processing (P100), the observed equipment management unit 231 is implemented. First, the relay apparatus 200 (specifically, the processor 250) specifies an observation target manufacturing line and specifies the manufacturing line 100 for which the GHG emission is to be calculated (P101).

Next, the relay apparatus 200 specifies a maximum number of pieces of equipment that can serve as the observed equipment in the observation target manufacturing line in consideration of a processing amount, a processing time, an electric power consumption associated with the processing, or the like allowable in the manufacturing line (P102).

Further, the relay apparatus 200 creates an equipment list in which pieces of equipment working in the observation target manufacturing line are listed based on information on the observation target manufacturing line specified in P101 (P103). In order to create the equipment list, the relay apparatus 200 refers to the manufacturing line configuration information 630 to identify by which processes the target manufacturing line is constituted. In addition, the relay apparatus 200 refers to the process environment information 620 to identify which piece of equipment works in each identified process.

Then, the relay apparatus 200 creates an observed equipment candidate list, which is a list of candidates for the observed equipment, by extracting, from the equipment list created in P103, pieces of equipment including the I/F provided for exchanging the observation data with the outside (P104). In order to create the observed equipment candidate list, the relay apparatus 200 refers to the equipment information 670 to identify the I/F of each piece of equipment.

Then, in order to select the observed equipment, the relay apparatus 200 distributes the processing (P105 and P106) in consideration of the maximum number of pieces of allowable observation target equipment specified in P102 and the number of pieces of observable equipment including the I/F usable for the observation listed in P104.

When the number of observation targets is one (that is, when a first piece of equipment is the observation target), the relay apparatus 200 estimates the cycle time of the manufacturing line based on an actual value of an operation of one observed process and the standard operation time of another process that is not the observation target. Accordingly, accuracy of the estimation is improved by selecting processes having a large deviation in the operation time. Therefore, the relay apparatus 200 selects a process having a longest standard operation time as the observation target process among the processes in which the observable equipment listed in P104 works, and sets a piece of equipment that performs the process as the observed equipment (P107).

When the number of observation targets is two (that is, when the first piece of equipment and a second piece of equipment are observation targets), the relay apparatus 200 estimates the cycle time of the manufacturing line based on actual values of the operation time of the two observed processes and the standard operation time of another process that is not the observation target. Accordingly, accuracy of the estimation is improved by maximizing an observed interval (that is, a distance between the two observed processes). Therefore, the relay apparatus 200 selects processes at both ends that can be observed (that is, selects processes such that a distance between the processes is maximized) from the processes in which the observable equipment listed in P104 works, and sets each piece of equipment that performs the respective process as the observed equipment (P108).

When the number of observation targets is three or more (that is, when the first piece of equipment, the second piece of equipment, and a third piece of equipment are included in the observation target), the relay apparatus 200 first selects two processes that maximize the observed interval (that is, the distance between the two observed processes), sets each piece of equipment that performs the respective process as the observed equipment, then selects a process having a large deviation in the operation time, which has a high possibility of affecting the estimation accuracy of the cycle time, and sets a piece of equipment that performs the process as the observed equipment (P109). By maximizing the observed interval, the accuracy of the estimation of the cycle time can be improved. At the same time, the accuracy of the estimation can be improved by selecting a process having a large deviation in the operation time, which has a high possibility of affecting the estimation accuracy of the cycle time. Therefore, as observation target processes, the relay apparatus 200 selects processes at both ends that can be observed from the processes in which the observable equipment listed in P104 works, and further selects a process having a longest standard operation time from the processes in which the observable equipment listed in P104 works. The relay apparatus 200 performs selection related to the standard operation time up to the number of observation targets.

Figure 9:
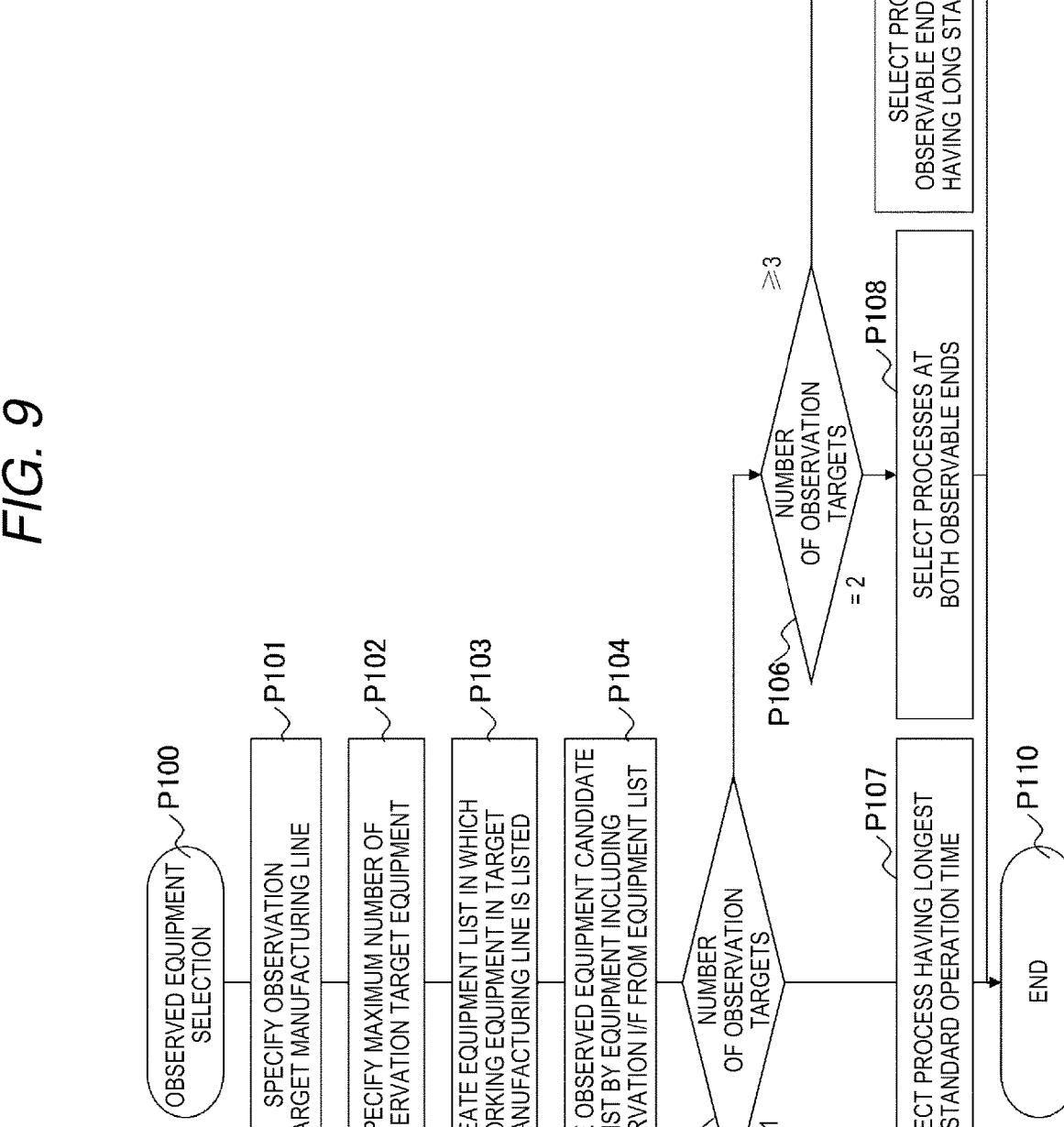
FIG. 9 is a flowchart showing an example of observed equipment selection.

FIG. 9 shows an example in which the length of the standard operation time may greatly affect the estimation of the cycle time in P107 and P109, and the relay apparatus 200 may refer to an actual value of a longest operation time in past actual performance information on each process stored in the process actual performance information 660, for example. From a viewpoint other than the length of the standard operation time, a process having a large deviation in the operation time may be specified, and a process that greatly affects the estimation of the cycle time may be specified. Then, it is possible to select each piece of equipment that performs the respective specified process as the observation target. The above processing is performed, and the observed equipment selection processing (P100) ends (P110).

Next, an example of standard operation time management will be described with reference to FIG. 10. By managing the standard operation time, it is possible to improve accuracy of estimating the activity amount of each process required when calculating the GHG emission in the manufacturing line that is the observation target of the relay apparatus.

In standard operation time management (P200), the standard operation time management unit 222, the standard operation time correction unit 232, and the like are implemented. The relay apparatus 200 (specifically, the processor 250) collects, as the actual value of the operation time, a start time and an end time of an operation of a process performed by a piece of equipment from all pieces of working equipment selected as the observation target in the manufacturing line in the observed equipment selection processing P100 (P201).

The relay apparatus 200 adds observation data as a new entry into the process actual performance information 660 based on the actual performance information of all the observation target processes collected in P201 (P202).

The relay apparatus 200 compares the standard operation time of each process stored in the process environment information 620 with the actual operation time of each observed process stored in the process actual performance information 660 for each process constituting the observation target manufacturing line. When a difference between the standard operation time and the actual value exceeds a correction threshold value stored in the process environment information 620, the standard operation time stored in the process environment information 620 is corrected (P203). A degree of correction may be specified in advance, such as correcting by ½ of the threshold value.

If the number of pieces of observation target equipment is one (P204), the standard operation time management processing ends (P207). If the number of pieces of observation target equipment is larger than one (P204), the relay apparatus 200 refers to the manufacturing line time information 640. Then, the cycle time and the takt time in the manufacturing line time information 640 referred to are compared with a takt time of the observation target manufacturing line and a cycle time estimated from an actual measurement value of the observation target process and the standard operation time of a process that is not the observation target. As an example of a method for calculating the takt time of the manufacturing line, a total of the standard operation time set for each process constituting the manufacturing line is obtained as the takt time. If the difference exceeds a correction threshold value set for the manufacturing line, the takt time in the manufacturing line time information 640 is corrected (P205). A degree of correction may be specified in advance, such as correcting by ½ of the threshold value.

When the takt time of the manufacturing line is corrected in P205, the relay apparatus 200 corrects, according to the corrected takt time, the standard operation time of the process constituting the manufacturing line, which is not the observation target (P206).

The above processing is performed, and the standard operation time management processing ends (P207). In the standard operation time management (P200), for example, a cycle time for each product to be manufactured can be calculated using a calculation formula shown in FIG. 11. The cycle time may be a time during which the product to be manufactured stays in the manufacturing line ([a time when the product is output from the manufacturing line]−[a time when the product is input to the manufacturing line]), and the assumed manufacturing line is a straight line without branching. Accordingly, when three or more points are measurable, the cycle time can be calculated by selecting two points having a longest interval therebetween in the manufacturing line and applying the calculation formula when two points are observable. Regarding a process for which the actual measurement value can be acquired, the acquired actual measurement value can be used to correct the standard operation time of the process using the threshold value.

Next, an example of activity amount calculation will be described with reference to FIG. 12. FIG. 12 shows a flowchart of an activity amount calculation example of estimating the activity amount of each process required for calculating the GHG emission in the manufacturing line that is the observation target of the relay apparatus.

In the activity amount calculation (P300), first, the relay apparatus 200 (specifically, the processor 250) specifies an observation target manufacturing line in order to specify the manufacturing line that is the observation target (P301). Then, a date and time for calculating the activity amount of the observed manufacturing line is specified (P302). Next, based on information on the manufacturing line specified in P301, the manufacturing line configuration information 630 is referred to in order to identify by which processes the target manufacturing line is constituted. In order to identify which piece of equipment works in each identified process, the process environment information 620 is referred to, and an equipment list is created in which working equipment in the target manufacturing line is listed (P303).

The relay apparatus 200 refers to the list created in P303, refers to the process actual performance information 660 for the working equipment in the manufacturing line, and extracts actual performance information on each piece of equipment that works at the date and time specified in P302 (P304).

Based on a result of P304, the relay apparatus 200 extracts a work time from information on actual work performance of observed target equipment as the activity amount of the working equipment in the process (P305). On the other hand, in the target manufacturing line, for working equipment in a process that is not the observation target, the standard operation time of the process is the activity amount (P306).

The relay apparatus 200 specifies, based on the power source use plan 610, information on a breaker used by the working equipment in each process in the process environment information 620 and a power source type of electric power supplied to each breaker, and corrects the activity amount according to the power source type used in each process, such as reducing the activity amount when the process is performed using renewable energy as a power source (P307).

The above processing is performed, and the activity amount calculation processing ends (P308). In the activity amount calculation (P300), the activity amount can be calculated using a calculation formula shown in FIG. 13.

In the manufacturing line, not all pieces of equipment necessarily include an information-providing interface (I/F), and information required for activity amount calculation may not be acquired. Here, for example, it is not easy to simultaneously replace all the pieces of equipment from the viewpoint of a production plan, an investment budget, and the like. In addition, there is equipment to which I/F addition requires high cost and is difficult due to an old model or the like. Therefore, it is conceivable to calculate the activity amount of the equipment using a cycle time of "work time÷actual number of products", which is a time required until one product is produced through a plurality of processes. However, if a breakdown of the cycle time is unknown, accuracy may decrease.

In such a case, it is still possible to calculate the activity amount while preventing the decrease in the accuracy by compensating information on the equipment using the managed standard operation time. Then, the GHG emission can be calculated based on the activity amount, and thus contribution from the viewpoint of environment is implemented.

When the activity amount of a process that is not observable is estimated using the standard operation time, it is conceivable that estimation accuracy decreases since an operation time of each process varies during high-mix low-volume production. As a result, it is conceivable that accuracy of a calculated GHG emission decreases.

In this case, the decrease in the estimation accuracy can still be prevented by extracting the observation target as described above. It is also possible to select observation target equipment from a list in consideration of power consumption and the like.

For example, the standard operation time may be managed from the following viewpoint to improve the estimation accuracy. The relay apparatus 200 may correct the standard operation time based on data referring to, for example, a production plan, an equipment maintenance plan, and an operator personnel plan for manufacturing a product. With respect to the production plan, for example, when the same product is manufactured for a long period of time, a correction may be executed as necessary to shorten the standard operation time since it is expected that proficiency of an operator is improved over time. With respect to the maintenance plan, immediately after a maintenance of equipment is completed and immediately before the maintenance, since it is conceivable that a possibility of failure of the equipment increases as a date and time of a planned maintenance approaches, a correction may be performed to lengthen the standard operation time of a process in which the equipment works. With respect to the personnel plan, since it is expected that proficiency of an operator is improved according to a frequency with which the operator is in charge of the same process, a correction may be performed to shorten the standard operation time.

The relay apparatus 200 may correct the standard operation time by referring to, for example, skill information on an operator. As an example, the skill information can be used as a weight for shortening the standard operation time of a process if a skill level of the operator in charge of the process is high, and for lengthening the standard operation time of the process if the skill level of the operator in charge of the process is low.

As an example, the skill information may be data in a table format that is managed for each process and stores the standard operation time corresponding to the skill level of the operator. For example, the skill level of the operator may be appropriately updated according to experience of the operator in charge of the process. When the operator in charge of the process is changed, contents of the skill information may be changed accordingly.

As described above, the following relay apparatus and the following method are provided. That is, there is provided a relay apparatus that refers to a production plan, an equipment maintenance plan, a personnel plan, and an electric power use plan for manufacturing a product, manages processes constituting a manufacturing line, a standard operation time, working equipment and a specification thereof, and an I/F provided in each piece of equipment, manages the standard operation time corresponding to a skill level expected for an operator in charge of each process, selects a piece of equipment from which information is to be acquired in order to calculate a GHG emission, acquires observation information at the time of manufacturing the product, corrects the standard operation time of a process related to the piece of equipment based on observation information from the piece of equipment, calculates a cycle time of the product in the manufacturing line, obtains a breakdown of the cycle time for each process, and calculates the GHG emission at the time of manufacturing each product.

There is also provided a method for correcting a standard operation time of each process in consideration of a cycle time (actual value) required for manufacturing a product in a target manufacturing line, an equipment work time (actual value) of a process from which information can be acquired, a production plan for manufacturing the product, and the like, even during high-mix low-volume production in which an operation time of each process greatly varies due to a change in operation contents before an operator becomes proficient. The production plan may include information such as what product is manufactured, when the product is produced, how many products are produced, by whom the product is produced, and who is in charge of which process and when.

According to the relay apparatus and the method, since the GHG emission of the manufacturing line is calculated, it is possible to select an appropriate piece of equipment from which information is acquired in order to observe a work state, and to correct, based on a work state of a part of pieces of the observed equipment in the manufacturing line, the standard operation time or the like used to estimate a work state of a piece of equipment that is not observable. When calculating the activity amount, the activity amount of the manufacturing line may be calculated in consideration of a power source type (traditional/renewable energy) of electric power used by each piece of equipment.

In the relay apparatus, for example, accuracy of estimation of a takt time can be improved by observing a start point and an end point of the observation target manufacturing line or the vicinity of the start point and the end point, and as a result, the accuracy of the estimation of the GHG emission can be expected to be improved. For example, when three or more pieces of equipment are observable, the accuracy of GHG emission estimation can be expected to be improved by selecting, as observation targets, a piece of equipment having a large environmental load (power consumption), a piece of equipment set in a difficult process, or a piece of equipment set in a process of which an operator having poor proficiency is in charge.

Although the embodiment has been described above, the invention is not limited to the above-described embodiment, and includes various modifications and equivalent configurations within the scope of the claims. For example, the above-described embodiment has been described in detail to facilitate understanding of the invention, and the invention is not limited to those including all the above-described configurations. A part of a configuration of one embodiment may be replaced with a configuration of another embodiment. A configuration of another embodiment may be added to a configuration of one embodiment. Another configuration may be added to a part of the configuration of each embodiment, and a part of the configuration of each embodiment may be deleted or replaced with another configuration.

The various types of data described above may be stored in the auxiliary storage device 260, and the relay apparatus 200 may read the data into the memory 210 to perform processing as necessary. The relay apparatus 200 which transmits information to the higher-level system is described as an example of the activity amount calculation apparatus. Alternatively, the activity amount calculation apparatus may be implemented as a computer different from the relay apparatus.

What is claimed is:

1. An activity amount calculation apparatus comprising:
a processor;
a storage unit; and
an interface configured to acquire information from a piece of equipment used for an operation of a process in a manufacturing line, wherein
the storage unit
manages a standard operation time related to an operation time in the process, and
the processor
acquires, using the interface from a piece of equipment that is an observation target in the manufacturing line, an actual value of a work time of the piece of equipment, and
calculates, using the acquired actual value and the standard operation time of a process performed by a piece of equipment that is not the observation target in the manufacturing line, an activity amount of each piece of equipment in the manufacturing line.

2. The activity amount calculation apparatus according to claim 1, wherein
when the activity amount is calculated with a first piece of equipment serving as the observation target among pieces of equipment observable as the observation target in the manufacturing line, the processor sets, as the first piece of equipment, a piece of equipment performing a process whose standard operation time is longest among the pieces of equipment observable as the observation target, and acquires the actual value from the first piece of equipment.

3. The activity amount calculation apparatus according to claim 1, wherein
when the activity amount is calculated with a first piece of equipment and a second piece of equipment serving as the observation target among pieces of equipment observable as the observation target in the manufacturing line, the processor sets, as the first piece of equipment and the second piece of equipment, pieces of equipment performing processes having a largest interval therebetween among the pieces of equipment observable as the observation target, and acquires the actual value from the first piece of equipment and the second piece of equipment.

4. The activity amount calculation apparatus according to claim 1, wherein
when the activity amount is calculated with a first piece of equipment, a second piece of equipment, and a third piece of equipment serving as the observation target among pieces of equipment observable as the observation target in the manufacturing line, the processor sets, as the first piece of equipment and the second piece of equipment, pieces of equipment performing processes having a largest interval therebetween among the pieces of equipment observable as the observation target, acquires the actual value from the first piece of equipment and the second piece of equipment, sets, as the third piece of equipment, a piece of equipment that is different from the two pieces of equipment and that performs a process whose standard operation time is longest, and acquires the actual value from the third piece of equipment.

5. The activity amount calculation apparatus according to claim 1, wherein the storage unit stores past actual performance information on each process related to the operation time, and when the activity amount is calculated with a first piece of equipment serving as the observation target among pieces of equipment observable as the observation target in the manufacturing line, the processor sets, as the first piece of equipment, a piece of equipment performing a process whose operation time is longest in the actual performance information among the pieces of equipment observable as the observation target, and acquires the actual value from the first piece of equipment.

6. The activity amount calculation apparatus according to claim 1, wherein when a difference between the standard operation time of the process stored in the storage unit and the acquired actual value on the process predetermined threshold value, the processor corrects the standard operation time of the process stored in the storage unit.

7. The activity amount calculation apparatus according to claim 1, wherein the storage unit manages a takt time which is a planned value related to manufacturing of a product in the manufacturing line, and a cycle time that is an actual value, and when a difference between the takt time and the cycle time of the manufacturing line stored in the storage unit and an acquired takt time and an acquired cycle time related to the manufacturing line exceeds a predetermined threshold value, the processor corrects the standard operation time of the process performed by the piece of equipment that is not the observation target stored in the storage unit.

8. The activity amount calculation apparatus according to claim 1, wherein the processor corrects, based on a production plan by which a product is manufactured, the standard operation time managed using the storage unit.

9. The activity amount calculation apparatus according to claim 1, wherein the processor corrects, based on an equipment maintenance plan, the standard operation time managed using the storage unit.

10. The activity amount calculation apparatus according to claim 1, wherein the processor corrects, based on an operator personnel plan, the standard operation time managed using the storage unit.

11. The activity amount calculation apparatus according to claim 1, wherein the processor corrects, based on an electric power use plan of the manufacturing line, the standard operation time managed using the storage unit.

12. The activity amount calculation apparatus according to claim 1, wherein the processor corrects, based on operator skill information, the standard operation time managed using the storage unit.

13. The activity amount calculation apparatus according to claim 1, wherein the storage unit stores information on a type of a power source used by the piece of equipment in the process, and the processor calculates, further using the information on the type of the power source stored in the storage unit, the activity amount of each piece of equipment in the manufacturing line.

14. A system comprising:

the activity amount calculation apparatus according to claim 1; and a higher-level system configured to manage a manufacturing site, wherein the activity amount calculation apparatus is an apparatus configured to relay a manufacturing line in the manufacturing site and the higher-level system.

15. An activity amount calculation method performed by an activity amount calculation apparatus including a processor, a storage unit configured to manage a standard operation time related to an operation time in a process, and an interface configured to acquire information from a piece of equipment used for an operation of the process in a manufacturing line, the method comprising:

acquiring, by the processor using the interface from a piece of equipment that is an observation target in the manufacturing line, an actual value of a work time of the piece of equipment, and calculating, by the processor using the acquired actual value and the standard operation time of a process performed by a piece of equipment that is not the observation target in the manufacturing line, an activity amount of each piece of equipment in the manufacturing line.

\* \* \* \* \*